United States Patent [19]
Inman et al.

[11] Patent Number: 5,566,532
[45] Date of Patent: Oct. 22, 1996

[54] BAGGER FOR ORGANIC MATERIAL

[75] Inventors: Larry Inman; Mike Koskela, both of Astoria, Oreg.

[73] Assignee: Ag-Bag International Limited, Warrenton, Oreg.

[21] Appl. No.: 584,569

[22] Filed: Jan. 11, 1996

[51] Int. Cl.⁶ .............................. B65B 1/24; B65B 25/02
[52] U.S. Cl. .............................. 53/529; 53/530; 53/576; 100/100
[58] Field of Search .............................. 53/529, 530, 576, 53/527, 567, 255; 100/100

[56] References Cited

U.S. PATENT DOCUMENTS

| | | |
|---|---|---|
| 3,580,166 | 5/1971 | Longo . |
| 3,687,061 | 8/1972 | Eggenmuller . |
| 3,913,474 | 10/1975 | Lewis .............................. 53/530 X |
| 4,621,666 | 11/1986 | Ryan .............................. 53/576 |
| 4,951,452 | 8/1990 | Lundahl . |
| 5,159,877 | 11/1992 | Inman . |
| 5,297,377 | 3/1994 | Cullen .............................. 53/529 X |
| 5,398,487 | 3/1995 | Inman . |
| 5,425,220 | 6/1995 | Cullen .............................. 53/529 X |
| 5,459,982 | 10/1995 | Long .............................. 53/529 |
| 5,463,849 | 11/1995 | Cullen .............................. 53/529 X |
| 5,464,049 | 11/1995 | Cullen .............................. 53/529 X |
| 5,517,806 | 5/1996 | Cullen .............................. 53/529 X |

*Primary Examiner*—Horace M. Culver
*Attorney, Agent, or Firm*—Robert L. Harrington

[57] ABSTRACT

A bagger for organic material that incorporates gates that are yieldably biased to restrict the movement of the material into the bag until the material has been compacted. The gates are mounted at each side of a tunnel adjacent a material propelling rotor of the bagger. The rotor propels and compacts the material against the gates and when the force is sufficient the gates will yieldably open to permit material to flow into and deploy a portion of the bag on the ground. The arrangement of the gates reduces the force applied to the bag and thus limits the force urging the bagger to move away from the bag deposited on the ground.

4 Claims, 3 Drawing Sheets

BAGGER FOR ORGANIC MATERIAL

FIELD OF THE INVENTION

This invention relates to a bagging machine such as used for bagging silage, and more particularly to a mechanism provided on the machine for insuring a desired compaction of the silage.

BACKGROUND OF THE INVENTION

The description herein will primarily relate to bagging silage but it is conceived that other materials may require the same or similar compaction requirements. Accordingly, the reader is to understand that throughout the disclosure whereas the specific references are to bagging silage, other applications including compaction and bagging of other farm crop materials as well as compost materials and the like are contemplated. Hereafter such materials are sometimes collectively referred to as organic materials.

Silage is stored in a compacted state inside a closed container to prevent oxidation of the silage. Whereas stored silage ferments, in the presence of oxygen it will become acidic and spoil, and in absence of oxygen it will generate a glucose or sweet taste. The latter is desirable as a food crop for livestock and the former is highly undesirable. Thus, it is important to store silage in a relatively air free state.

Whereas silage has been commonly stored in silos, more recently it has been stored in large plastic bags (e.g., 8' diameter and 300' long). In order to insure that the stored silage is substantially air/oxygen free, the silage is pre-compacted. That is, the material is force fed into a short tunnel that is part of the bagging machine, wherein the material is compacted and then pushed out of the tunnel and into the bag. The process is ongoing and the bag is deployed off the tunnel only as needed to insure a tight compacted fit of the silage in the bag.

Typically a back stop is provided that holds the material in the tunnel until the desired compaction is attained. The back stop is tethered to the machine by cables carried by a pair of reels mounted on the sides of the machine. The reels resistively play out the cables, i.e., an adjustable brake mechanism prevents un-reeling of the cable until a preset pressure is attained which is established to coincide with the desired compaction. This manner of providing the desired compaction is disclosed in detail in U.S. Pat. Nos. 5,159,877 and 4,337,805. The disclosures therein of typical silage bagging machines is incorporated herein in their entirety.

The problem with the tethered back stop is that the apparatus of the back stop and cables (e.g., each being 300' in length) is cumbersome and requires re-reeling and hauling from site to site. Whereas a partially filled bag will itself provide a back stop, the force required to achieve compaction is significant and will force the bagging machine forward unless tethered to the backstop. Simply braking the wheels of the bagging machine is not adequate in many situations as the wheels will be skidded along the ground by the compaction force.

It is accordingly an objective of the present invention to provide suitable pre-compaction of the silage material in a tunnel of a bagging machine using an internal mechanism that eliminates the need for a tethered back stop.

SUMMARY OF THE INVENTION

In the preferred embodiment of the invention, the tunnel of the machine is provided with a gate-like structure. Multiple fork tines of high strength steel are projected from each side wall of the tunnel and form a barrier between the rotor (which force feeds the silage material into the tunnel) and the tunnel's open rear end (through which the silage material is deposited in a bag). The forks on each side are spaced apart in a vertical direction and they are mounted, e.g., to a common high strength tube that resistively allows uniform rearward pivoting of the tines. The two sides of the gate-like structure are interconnected by a drag bar equalizer to insure that the two sides open together and each gate structure is controlled by hydraulics coupled to a gas accumulator (nitrogen). The system resistively permits pivotal opening of the gates when subjected to a pressure that assures adequate compaction of the silage.

The silage material is force fed against the gate structure with the spacing between the tines being rapidly filled with silage to complete the barrier. As silage continues to be force fed against the tines, the material fills the entire tunnel space behind the tines in accordance with the preset pressure. At the point where a desired compaction is achieved, the resistance of the tines against rotation is overpowered and the gate sections start to open. Material starts to flow through the gate opening and between the tines as a compacted mass. The compacted mass is pushed rearwardly through the rear end opening and into the bag.

Whereas some loosening of the material initially takes place as the material moves through the gates and into the unfilled bag, as soon as the bag is partially filled, that bag portion becomes an anchor and compaction throughout movement through the tunnel is maintained. Brakes on the bagging machine assist in repacking the loose material as well as assisting in the retention of the packed material in the bag. Ongoing movement of the material through the gate opening continues with the gate being mostly open, e.g., 75% open but nevertheless it continues to apply pressure against the material flow thereby insuring a substantial resistance to movement of the compacted mass through the tunnel so as to continue the desired compaction.

The invention will be more fully appreciated with reference to the following detailed description and drawings attached and referred to in the description.

DESCRIPTION OF THE PREFERRED EMBODIMENT

Figure 1:
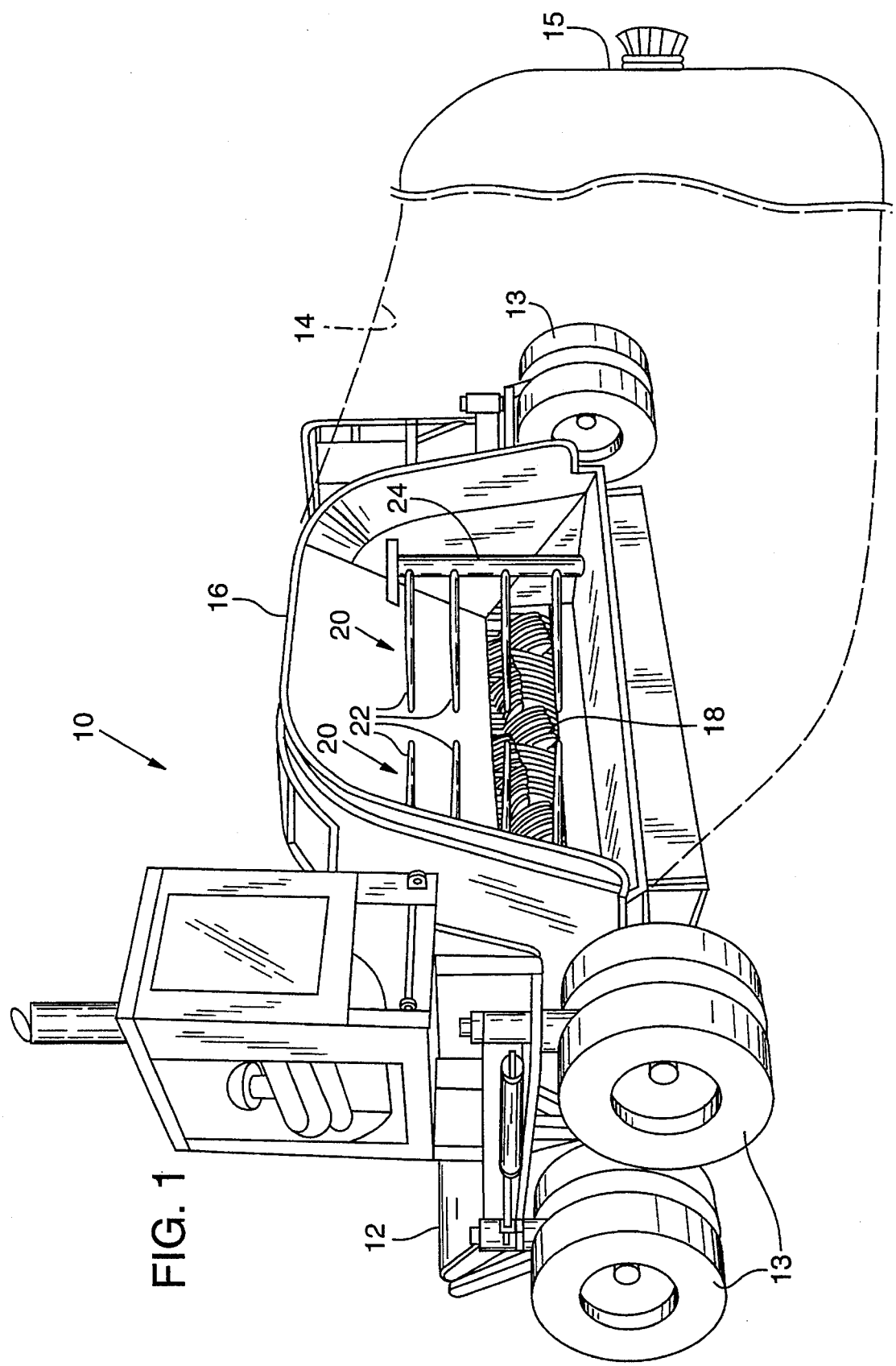
FIG. 1 is a view of a bagging machine of the present invention.

FIG. 1 illustrates a bagging machine 10 of the present invention that is configured to compact a loose material such as silage and insert the compacted material into a large elongate elastic bag. The machine 10 will control the amount of compaction of the material and in the process will remove excess air from the material.

The machine 10 has a conveyor 12 to receive the material that is to be deposited within a bag 14. The conveyor 12 is mounted strategic to a tunnel 16 of the machine 10 and delivers the material to a rotor 18 mounted at the entry of the tunnel 16. The rotor 18 is arranged to propel and compact the material and ultimately force the material into a bag 14. The bag 14 is mounted such that it surrounds the tunnel 16 and as the material is forced into the bag 14, the bag 14 will be deployed off of the tunnel 16.

A pair of gates 20 are pivotally mounted on the machine 10 adjacent the rotor 18 in the tunnel 16 and are provided to restrict the movement of the material into the bag 14 until the material is sufficiently compacted by the rotor 18. A gate 20 is pivotally mounted on each side of the tunnel 16 adjacent the rotor 18. The gates 20 are mechanically joined together so they will pivot in unison. The positioning and pivoting of the gates 20 are controlled by a hydraulic system which is later explained.

The gates 20 have extending tines 22 that extend radially from a supporting post 24 with the tines 22 extending generally from the side of the tunnel 16 toward the center of the tunnel 16. The gates 20 are arranged to provide a yieldable resistance to resist the flow of the compacted material into the bag 14.

In operation, a bag 14 is fitted to the tunnel 16 of the machine 10. A section of the bag 14 is deployed off the tunnel 16 and tied to form a closed end 15. The gates 20 are pivoted (positioned) to an initial closed position (as indicated by arrows 19 and position 21 in FIGS. 2 and 3). The gates 20 are pivoted such that the tines 22 of each gate are at a slight angle relative the longitudinal axis of the rotor 18. The angle will vary depending on the material that is to be compacted and inserted into the bag 14. The gates 20 are urged to remain in the initial set closed position by a yieldable biasing force which will later be explained.

Material to be deposited in the bag 14 is placed on the conveyor 12 and the conveyor 12 in turn delivers the material to the rotor 18. The rotor 18 is arranged to propel, compact and force the material into the bag 14. The pair of gates 20 positioned adjacent the rotor 18 in the initial closed position will restrict the movement of the material through the tunnel 16 and into the bag 14 until the force of the material acting on the gates 20 increases to such a degree that the gates 20 are forced to pivot open. As the gates 20 (due to the force applied by the material being forced against the gates) are forced to pivot, the tines 22 will pivot away from the rotor 18, permitting material to flow past the gates 20 and into the bag 14 in the controlled compacted state. As the material is forced into the bag 14, a portion of the bag will be deployed off the tunnel 16 according to the amount of material forced into the bag and be deposited on the ground. The deployed portion of the bag 14 deposited on the ground with the material inserted therein serves to act as an anchor. Additional material being forced into the anchored bag 14 will exert a counter force that will urge the machine 10 to move forwardly with respect to the bag 14 since the partially filled bag deposited on the ground is essentially non moveable.

The force generated by the rotor 18 propelling and compacting the material is initially transmitted to the gates 20. The force generated by the rotor 18 propelling and compacting the material is thus transmitted to the machine 10 itself since the gates 20 are mounted to the machine 10. The gates 20 do not open to permit material to flow into the bag until the force exerted on the gates 20 exceeds the preset biasing force holding the gates 20 in the preset closed position. The gates 20 restricting the flow of the material into the bag 14 until the material is in the compacted state eliminates the need of releasably anchoring the machine to restrict machine movement that was common in previous bagging machines.

The force imparted by the material being propelled and compacted by the rotor 18 is applied to and resisted by the gates 20. As the force generated by the propulsion and compaction of the material increases the gates will be forced to open permitting the material to flow past the gates 20 through the tunnel 16 and into the bag 14. The force is directed against the gates 20 instead of the bag 14 and thus does not urge the machine forward until the force generated is sufficient to urge the gates 20 to open permitting material to flow into the bag 14. The force applied to the bag is thus reduced which reduces the force urging the machine 10 to move away from the portion of the bag 14 deposited on the ground. The conventional brakes provided on the wheels 13 of the machine are utilized when required to retard the movement of the machine 10 away from the portion of the bag 14 deposited on the ground.

Figure 2:
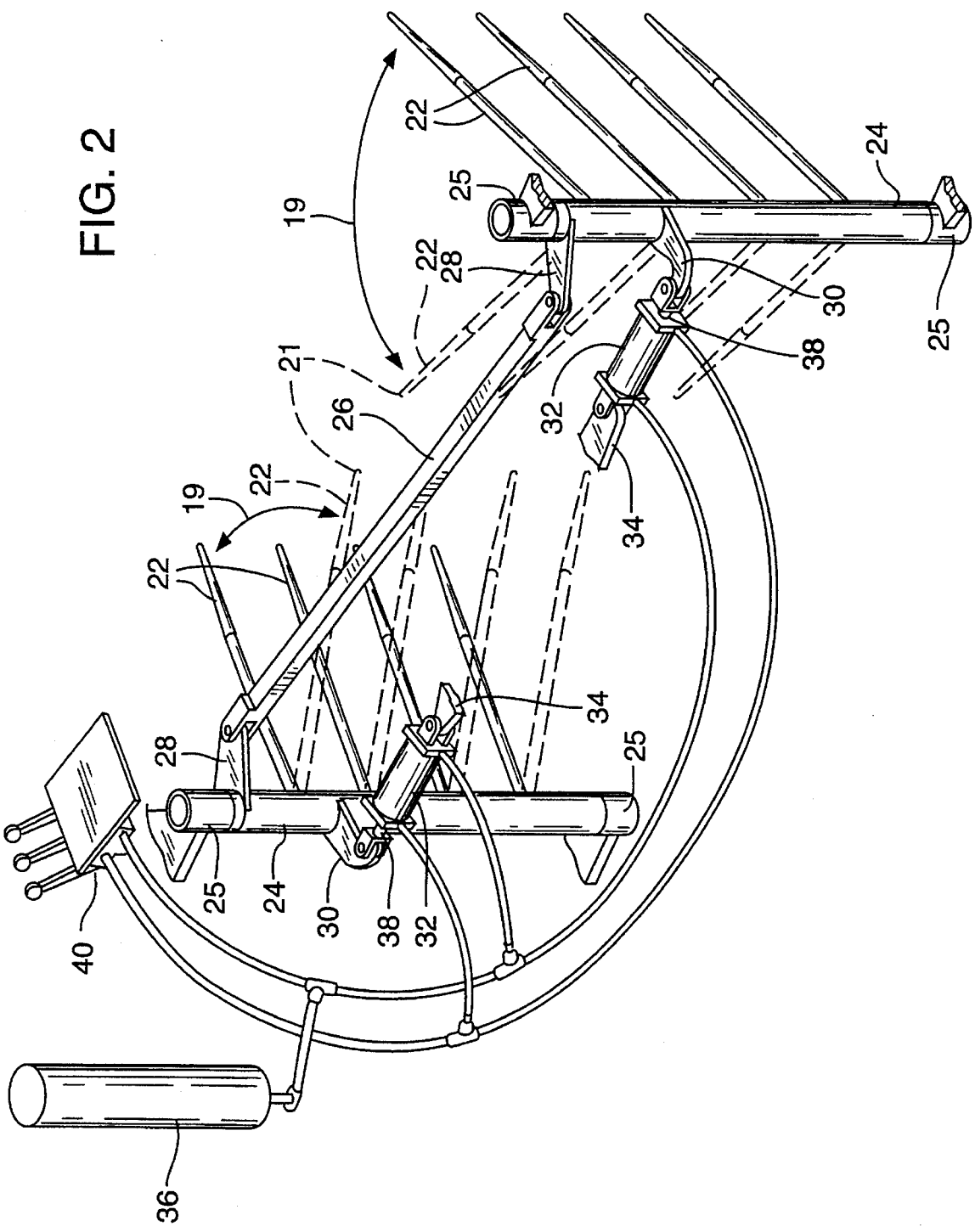
FIG. 2 is a perspective view illustrating a pair of restraining gates utilized in the machine of FIG. 1; and, FIG. 3 is a plan view of the restraining gates of FIG. 2.
Figure 3:
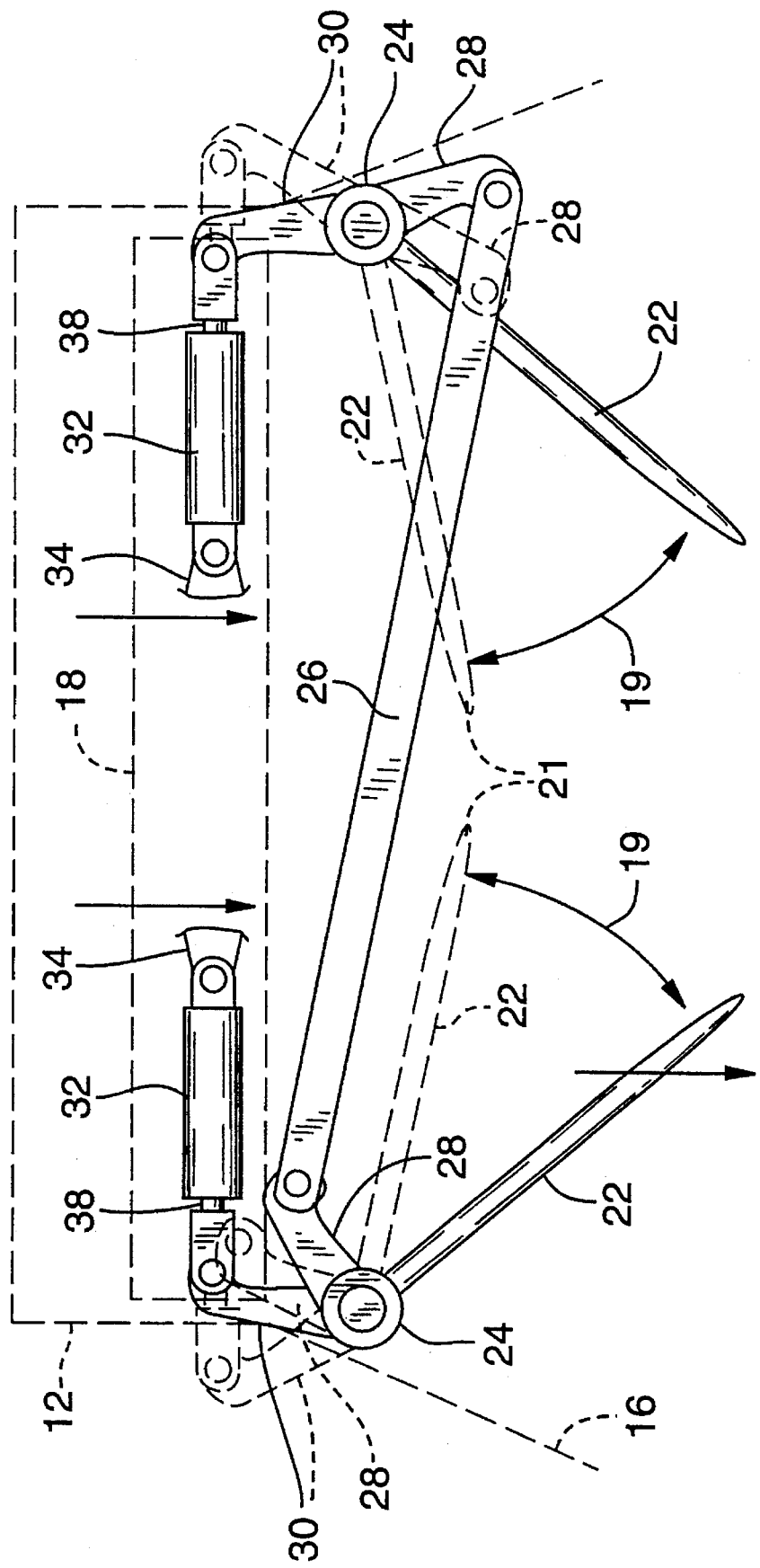

Refer now to FIGS. 2 and 3 which further illustrates the arrangement of the pair of gates 20 that are mounted in the entry of the tunnel 16 adjacent the rotor 18. Each of the gates 20 have a vertical post 24 positioned at the side of the tunnel 16 (see FIG. 1) that is pivotally mounted to brackets 25 (best seen in Fig. 2) extending from the frame of the machine 10. The tines 22 are mounted to the post 24 and extend radially from the post 24 generally toward the center of the tunnel 16. Each of the posts 24 are mechanically coupled together by a beam 26. Brackets 28 are provided on each of the posts 24 to pivotally mount the opposed ends of the beam 26. The brackets 28 on the posts 24 are arranged such that the posts 24 will counter rotate due to the mechanical connection of the beam 26 when they are pivoted. Each gate 20 will, therefore, open and close in unison with the other gate 20.

Each post 24 has a cylinder mounting bracket 30 that extends from the post 24 and is arranged for the pivotable mounting of a cylinder 32. The opposite end of each cylinder 32 is pivotally mounted on a bracket 34 extending from the frame of the machine 10. Each of the cylinders 32 are coupled hydraulically to a conventional accumulator 36. The accumulator 36 is of the gas type (such as nitrogen) and will provide a yieldable biasing force that will allow the piston of the cylinder 32 to extend and retract. When the force applied to the gates 20 by the material being propelled and compacted by the rotor 18 exceeds the biasing force applied to the gates 20 by the accumulator 36 via cylinders 32, the piston 38 will be forced to retract into the cylinder 32. The piston 38 of the cylinder 32 as it retracts will force hydraulic fluid to flow into the accumulator 36 further compressing the gas in the accumulator 36.

Manual hydraulic controls 40 are also provided for the manual positioning of the cylinders 32 and thus to adjust the position of the pair of gates 20. The manual controls 40 permit a user to adjust the initial open position of the gates 20 relative to the rotor 18 depending on the type of material that is to be inserted into the bag 14. Additionally, the manual controls 40 are utilized to adjust the yieldable biasing force provided by the accumulator 36.

In this embodiment, the gates 20 each have four tines 22 extending from each post 24. It will be appreciated that the number of tines provided on each gate 20 may be varied to suit the requirements and the type of material that is to be compacted and deposited into the bag 14. The length and shape of each tine 22 may also be varied to suit the intended use of the bagging machine 10.

Those skilled in the art will recognize that modifications and variations may be made without departing from the true spirit and scope of the invention. The invention is therefore not to be limited to the embodiments described and illustrated but is to be determined from the appended claims.

We claim:

1. A bagging machine including a compaction assist mechanism comprising:

a tunnel including a front inlet and a rear outlet, a rotor positioned in the front inlet for force feeding an organic crop material into the tunnel, and a bag surrounding the rear outlet and defining thereby a bag opening for receiving the organic material from the tunnel;

a gate mechanism positioned in the tunnel between the inlet and outlet, said gate mechanism having a closed position providing a barrier to movement of the organic material through the tunnel and a graduated opened position, and pressure means urging the gate to the closed position and responding to an opposing pressure applied by the force feeding of the material against the gate for graduated opening of the gate following compaction of the organic material against the gate.

2. A bagging machine as defined in claim 1 wherein said gate mechanism comprises: multiple fork tines in vertical spaced apart relation extended from each side toward the middle to cooperatively provide the barrier in the tunnel, said fork tines mounted to a rotatable post at each side, rotation of which provides the graduated opening of the tines.

3. A bagging machine as defined in claim 2 including a hydraulic cylinder rotatably controlling rotation of the two posts, and an accumulator coupled to the hydraulic cylinders for resistively permitting opening of the tines under pressure.

4. A bagging machine as defined in claim 3 including a drag link between the hydraulic cylinders providing equalized resistance to opening of the fork tines at the two sides.

* * * * *